MAGNETIC CORE MEMORY SYSTEM
Filed April 30, 1963 4 Sheets-Sheet 1
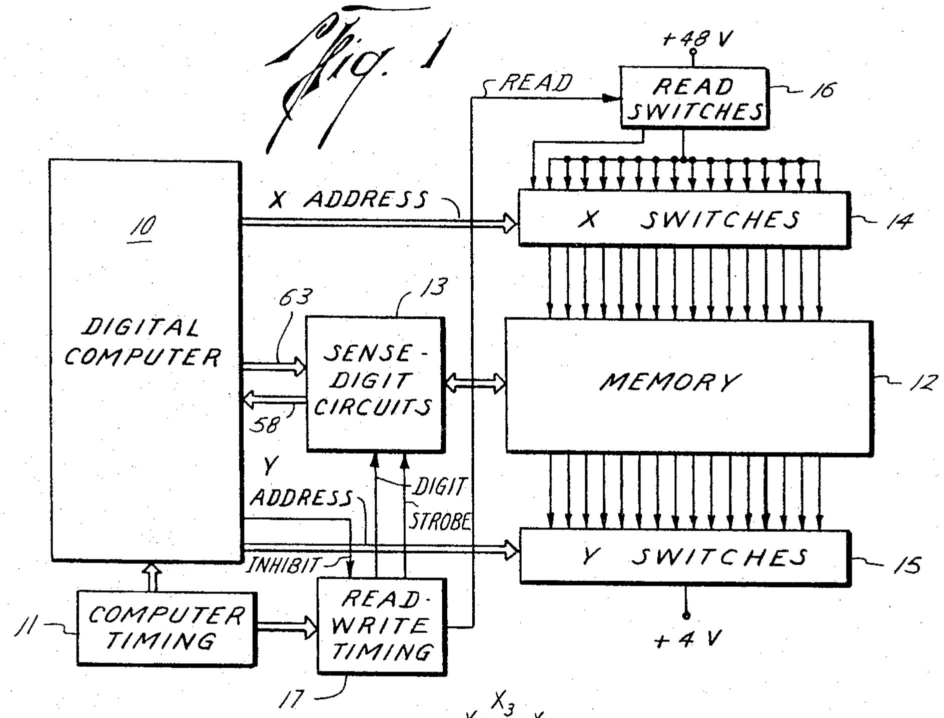
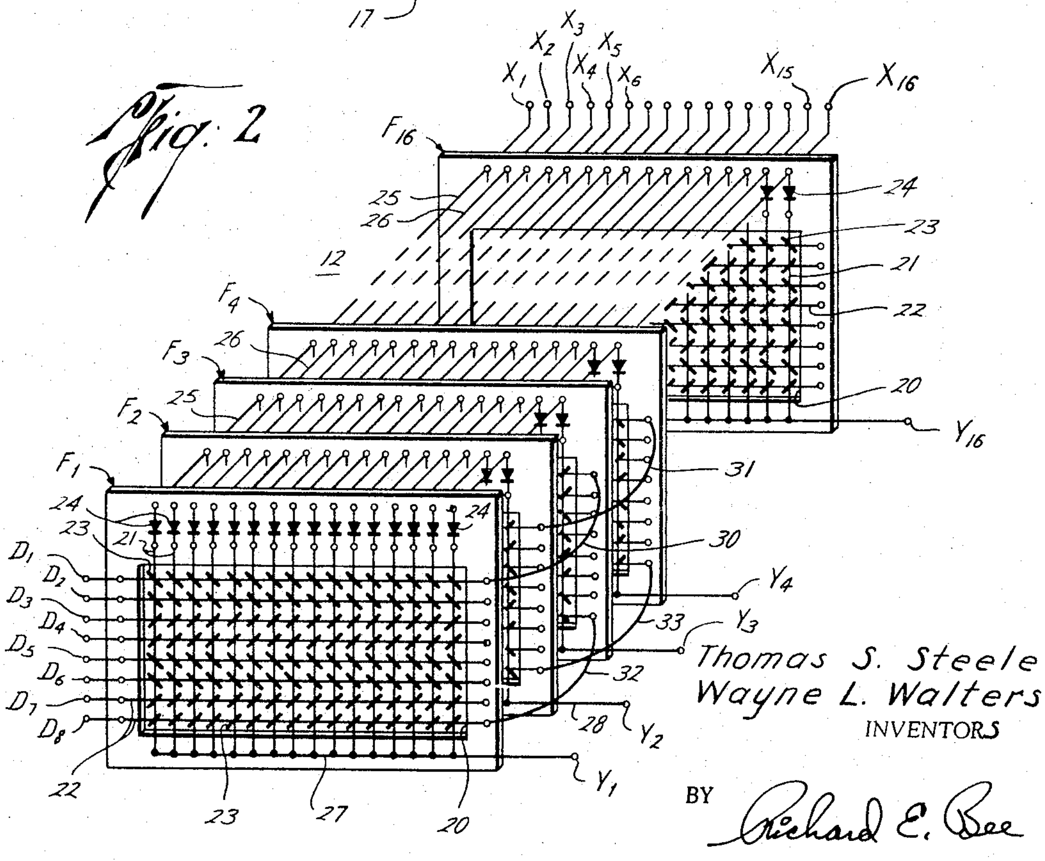
Thomas S. Steele
Wayne L. Walters
INVENTORS
BY Richard E. Bee
ATTORNEY

MAGNETIC CORE MEMORY SYSTEM

Filed April 30, 1963

4 Sheets-Sheet 2

Thomas S. Steele
Wayne L. Walters
INVENTORS

BY Richard E. Bee
ATTORNEY

Thomas S. Steele
Wayne L. Walters
INVENTORS
BY
Richard E. Bee
ATTORNEY

Thomas S. Steele
Wayne L. Walters
INVENTORS

BY Richard E. Bee
ATTORNEY

United States Patent Office 3,360,786

Patented Dec. 26, 1967

3,360,786

MAGNETIC CORE MEMORY SYSTEM

Thomas S. Steele, Minneapolis, and Wayne L. Walters, Bloomington, Minn., assignors to Electro-Mechanical Research, Inc., Sarasota, Fla., a corporation of Connecticut Filed Apr. 30, 1963, Ser. No. 276,755

5 Claims. (Cl. 340—174)

This invention relates to magnetic core memory systems which are useful in various digital computers and electronic data processing equipment.

Heretofore the majority of magnetic core memory systems have been of the so-called "coincident current" type. These systems require that four (sometimes five) separate wires or lines pass through the openings in each of the individual magnetic cores. Since each of the magnetic cores is rather small and since many hundreds or thousands of these tiny cores may be used in a single memory system, it is a rather complicated and expensive task to thread the various wires through the various cores. Consequently, the cost of these memory systems is usually rather high.

In a technical article entitled, "Diode Steered Magnetic Core Memory," by Melmed and Shevlin appearing in the IRE Transactions on Electronic Computers, volume EC–8, No. 4, December 1959, pages 474–478, there is described a magnetic core memory system which, in theory, would appear to require that only two separate wires be passed through each of the individual magnetic cores. This technical article goes on to indicate, however, that it is, in practice, necessary to use a third wire through each core in order to reduce undesired cross-coupling of signals between wires to a tolerable level. In particular, the authors of this article have found that it is necessary to form the digit lines by using a pair of wires which are woven back and forth with respect to one another instead of using a single wire. This minimizes harmful cross-coupling of signals between the different digit lines. It also, however, considerably increases the difficulty and expense involved in constructing the memory system.

It is an object of the invention, therefore, to provide a new and improved magnetic core memory system which is much easier and less costly to construct.

It is another object of the invention to provide a new and improved magnetic core memory system wherein only two wires are passed through each of the individual magnetic cores and wherein there is a minimum of undesired signal cross-coupling between the different wires.

It is a further object of the invention to provide a new and improved magnetic core memory system wherein electrical transients and reverberations produced on the wires by a change of energization of the wires are more rapidly dissipated, thus allowing a higher speed of operation of the memory system.

In accordance with the invention, a magnetic core memory system comprises a system of elongated word lines positioned parallel to one another in a two-dimensional pattern. The memory system further includes a system of elongated digit lines positioned parallel to one another in a two-dimensional pattern, the digit lines lying at an angle with respect to the word lines and passing near the word lines at recurring junction points. The memory system also includes a plurality of magnetic core elements individually located at the various junction points so as to come under the influence of one of the word lines and one of the digit lines. In accordance with one feature of the invention, the various digit lines corresponding to the same digit positions in the different words are connected in series with one another in sequences which produce minimum net inductive coupling between any two sets of digit lines. In accordance with another feature of the invention, novel circuits are provided for operating the various digit lines in a rapid and efficient manner with a minimum of circuit complexity.

For a better understanding of the present invention, together with other and further objects thereof, reference is had to the following description taken in connection with the accompanying drawings, the scope of the invention being pointed out in the appended claims.

Referring to the drawings:

FIG. 1 is a general block diagram illustrating how the present invention is used in connection with a digital computer;

FIG. 2 is a perspective view of a representative embodiment of a core memory unit constructed in accordance with the present invention;

Figures 3A, 3B, 3C, 3D:
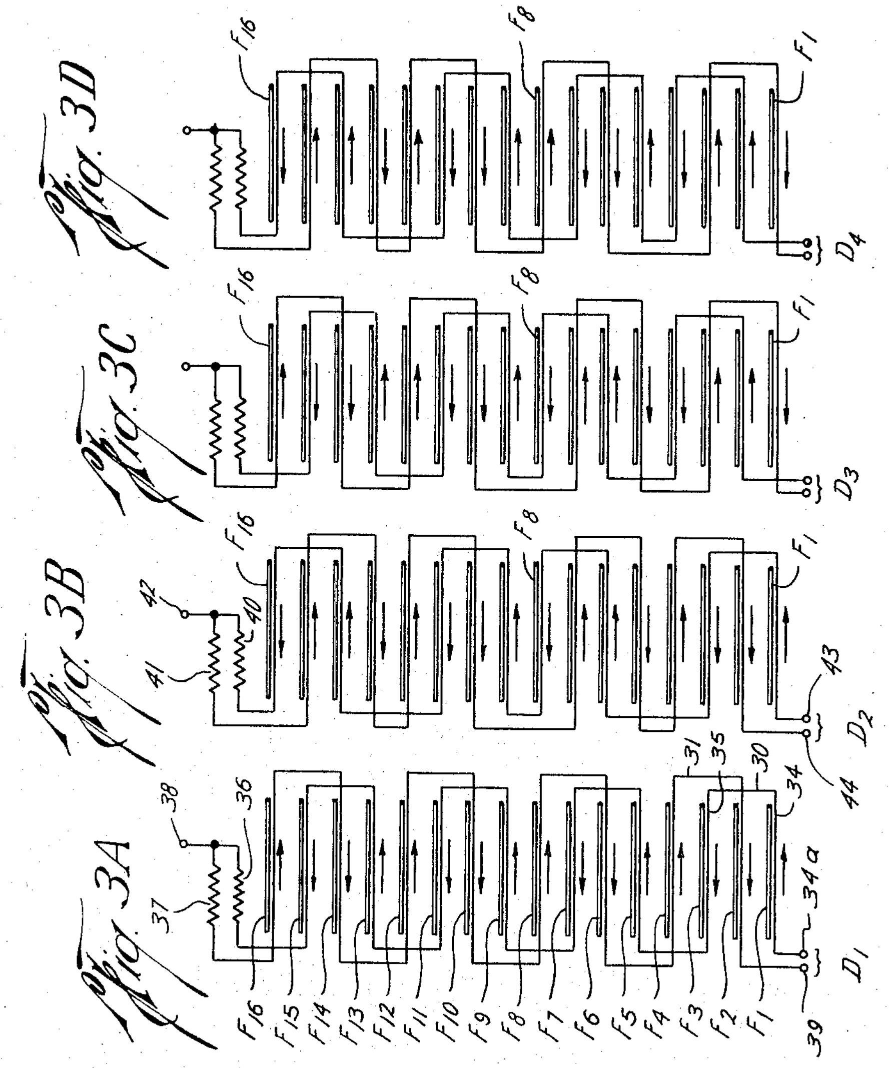
FIGS. 3A–3D are cross-sectional views taken on different horizontal planes through the core memory unit of FIG. 2.

Referring to FIG. 1 of the drawings, there is shown a digital computer system utilizing a memory system constructed in accordance with the present invention. The computer system of FIG. 1 includes a digital computer unit 10 which includes the various arthmetic circuits, programmer or control circuits and input and output circuits and devices normally encountered in a digital computer. Timing pulses or clock pulses for timing the various operations in the digital computer 10 are supplied thereto by a computer timing unit 11. The core memory unit of the present invention is represented by a memory unit 12. The memory unit 12 is coupled to the digital computer 10 by way of a system of sense-digit circuits 13. Sense-digit circuits 13 can pass new data signals from the computer 10 to the memory 12 for storage therein. Likewise, sense-digit circuits 13 can pass data signals previously stored in the memory 12 back to the computer 10 for use therein.

The locations at which different units of data, commonly referred to as "words," are stored in the memory 12 are determined by sets of X switches 14 and sets of Y switches 15. For any given word location, an appropriate one of the X switches is closed and an appropriate one of the Y switches is closed. Thus each word location is defined in terms of a pair of X and Y coordinates. Activation of these switches is controlled by appropriate X and Y address signals supplied by the digital computer 10. Each cycle of operation for the memory 12 is controlled by a set of read switches 16. Various control signals used by the sense-digit circuits 13 and the read switches 16 are provided by a read-write timing unit 17 which, in turn, is controlled by timing pulses or clock pulses from the computer timing unit 11. An inhibit signal is also supplied to the read-write timing unit 17 from the computer 10 for purposes of telling the timing unit 17 whether new data is to be stored in the memory 12 or whether the memory 12 is to retain the existing data.

Referring now to FIG. 2 of the drawings, there is shown in greater detail the construction of a representative embodiment of a core memory unit 12 constructed in accordance with the present invention. The core memory unit 12 includes a series of frame members or frame structures $F_1$, $F_2$, . . . $F_{16}$. A large rectangular opening or window 20 is provided in each of the frame structures $F_1$, $F_2$, . . . $F_{16}$. A series of parallel wires or lines 21 are strung across the window 20 of each of the frame structures $F_1$, $F_2$, etc. in a vertical direction. These vertical wires 21 will be hereinafter referred to as "word lines."

A second series of parallel wires or lines 22 are strung across the window 20 of each of the frame structures in a horizontal direction. These horizontal wires will be hereinafter referred to as "digit lines." Since the word lines 21 and the digit lines 22 are strung on the same side of the frame structure, these lines cross one another at regularly spaced points throughout the area of the window 20. These intersections or cross-points will hereinafter be referred to as "junction points." Each of the digit lines and word lines is covered with electrical insulation (e.g., a coating of enamel or the like) so that, while there may be mechanical contact, there is not electrical contact between the different lines at any given junction point.

There is located at each of the junction points between each of the word and digit lines in each of the frame structures a small magnetic core element 23. In the present embodiment, each of these magnetic core elements 23 is in the form of a small toroidal core and the two wires at the junction point pass through the center opening of the toroidal core. Thus, each core element 23 comes under the influence of the word line and the digit line passing through its center opening.

In the present illustrative embodiment, there are sixteen vertical word lines on each of the frame structures $F_1$, $F_2$, etc. Along the upper border of each frame structure there is mounted and connected in series with each of the word lines 21 a semiconductor diode 24. The upper terminal of each of the diodes 24 which are connected to the first word line on the left hand side of each of the frame structures $F_1, F_2, \ldots F_{16}$ are electrically connected to one another by means of a conductor or busbar 25 which runs from front to back through each of the frame structures $F_1, F_2, \ldots F_{16}$. This busbar 25 is designated as an $X_1$ busbar. In a similar fashion, the upper terminals of each of the diodes 24 which are connected to the word lines which are second from the left on each frame structure are electrically connected to one another by means of a second conductor or busbar 26. Busbar 26 is designated as an $X_2$ busbar. Similar connections are provided for the remainder of the word lines on each of the frame structures, the corresponding busbars being designated as $X_3, X_4 \ldots X_{16}$.

The bottom terminals of each of the vertical word lines 21 on frame structure $F_1$ are electrically connected to a common conductor or busbar 27. This busbar 27 runs along the bottom border of the frame structure $F_1$ and leaves the frame structure at the right hand side thereof. This busbar 27 is designated as a $Y_1$ busbar. In a similar manner, the bottom terminals of each of the vertical word lines 21 on frame structure $F_2$ are connected to a common conductor or busbar 28, which is designated as a $Y_2$ busbar. In a similar fashion, $Y_3, Y_4, \ldots Y_{16}$ busbars are provided for the remainder of the frame structures.

Any given one of the word lines 21 can be electrically energized by connecting a source of current between the end terminal of the appropriate X busbar and the end terminal of the appropriate Y busbar. Thus, to energize the first word line on the left hand side of frame structure $F_1$, the source of current would be connected between the $X_1$ and $Y_1$ terminals. In this case, only the first word line of frame $F_1$ would be energized.

The horizontal wires 22 in each of the frame structures are referred to as "digit lines." Since there are eight digit lines, $D_1, D_2 \ldots D_8$, which cross each word line, this means that in the present illustrative embodiment each word is composed of eight digits or binary bits of data. The upper-most digit line of each of the frame structures $F_1$, $F_2$, etc., is part of a complete $D_1$ digit line. These different portions of the complete $D_1$ digit line on the different frame structures are electrically connected in series wtih one another so that the magnetic core elements 23 constituting the first digit or bit of each word for all of the words on all of the frames are connected to a common output terminal or set of output terminals. In FIG. 2, the manner of interconnection between corresponding digit line portions on different ones of the frame structures $F_1$, $F_2$, etc., is indicated by conductors or jumpers 30, 31, 32 and 33. Conductor 30 connects horizontal digit line $D_1$ of frame $F_1$ to the horizontal digit line $D_1$ of frame $F_3$. The conductor 31 connects the horizontal digit line $D_1$ of frame $F_2$ to the horizontal digit line $D_1$ of frame $F_4$. Conductors or jumpers 32 and 33 represent corresponding connections for the lower-most $D_8$ digit lines.

A more complete showing of the interconnection of the digit line portions is given in FIGS. 3A–3D. The particular manner of interconnection for the different digit lines is an important feature of the present invention and, as will be seen, serves to minimize any undesired cross-coupling of signals between different digit lines. The view of FIG. 3A corresponds to a cross-sectional view taken on a horizontal plane extending through the $D_1$ digit lines of each of the frame structures $F_1, F_2 \ldots F_{16}$ of FIG. 2. Thus, conductor 34 in FIG. 3A is the portion of digit line $D_1$ on frame $F_1$, while conductor 35 is the portion of digit line $D_1$ on frame $F_3$. The interconnecting conductor or jumper 30 runs between the ends of conductors or lines 34 and 35.

If the complete $D_1$ digit line is traced down through the array of frame structures starting with the conductor 34, it is seen that the digit lines on the odd numbered frames, $F_1, F_3, F_5$, etc., are connected in series with one another, the digit line on the last odd numbered frame $F_{15}$ being connected to a rear end resistor 36. The resistor 36 is, in turn, connected in series with a second rear end resistor 37 so that, if a common terminal 38 is left disconnected, current flowing down the frame array on the odd numbered frames will be returned back to the front end of the array on the even numbered frames. Thus, starting at the back of the array with the resistor 37, it is seen that the digit lines on each of the even numbered frames $F_{16}, F_{14}, F_{12}$, etc. are connected in series with one another, the free end of the digit line on frame $F_2$ being connected to a terminal 39 which, together with terminal 34*a*, constitutes a set of input terminals for the complete $D_1$ digit line. Thus, with the rear terminal 38 disconnected, all of the sixteen $D_1$ digit line portions are electrically connected in series with one another.

The view of FIG. 3B corresponds to a cross-sectional view taken on a horizontal plane passing through the $D_2$ digit lines of each of the frame structures $F_1, F_2 \ldots F_{16}$. Assuming that a pair of rear end resistors 40 and 41 constitute part of the series circuit and that a terminal 42 therebetween remains disconnected, then each of the $D_2$ digit line portions on all of the different frames structures $F_1, F_2 \ldots F_{16}$ are connected in series with one another between a pair of input terminals 43 and 44. The precise manner of interconnection for the $D_2$ digit line portions is, however, not the same as for the $D_1$ digit lines of FIG. 3A. Note, for example, that the $D_2$ digit line portion on frame $F_8$ is connected to the $D_2$ digit line portion on frame $F_9$. This is different from the case of FIG. 3A where the $D_1$ digit line portion on frame $F_8$ is connected to the $D_1$ digit line portion on frame $F_{10}$. A closer comparison of FIGS. 3A and 3B will reveal that there are also other differences in the two interconnection patterns. These differences are important because they are selected so that the net inductive coupling between the complete $D_2$ digit line and the complete $D_1$ digit line is substantially or very nearly equal to zero. With zero inductive coupling, the net cross-coupling of signals between the two sets of digit lines is considerably reduced.

The interconnections are constructed so that this minimum inductive coupling occurs when current is flowing in the manner indicated by the arrows on either of the patterns of FIGS. 3A or 3B. Thus, for example, if terminals 38 and 42 of the $D_1$ and $D_2$ lines are disconnected and if a current source is connected between the $D_2$ input terminals 43 and 44 so that current flows through the $D_2$ digit lines in the manner indicated by the arrows, then no net voltage will appear between the input terminals 34a and 39 of the $D_1$ digit line due to changes in this $D_2$ current flow. A change in the $D_2$ current flow will induce voltage components on the individual portions of the $D_1$ line located on the individual ones of the frame structures $F_1$, $F_2$ . . . $F_{16}$. Because of the particular interconnections of the different portions of the $D_1$ and $D_2$ lines, however, the individual voltage components tending to cause induced current flow with one polarity on the $D_1$ line will be opposed by an equal number of voltage components tending to cause induced current flow with an opposite polarity on the $D_1$ line. Consequently, there will be no net induced current flow or induced voltage on the $D_1$ line taken as a whole.

FIG. 3C corresponds to a cross-sectional view taken on a horizontal plane passing through the $D_3$ digit lines of the frame structures $F_1$, $F_2$ . . . $F_{16}$ of FIG. 2. Similarly, FIG. 3D corresponds to a cross-sectional view taken along a horizontal plane passing through the $D_4$ digit lines of FIG. 2. The pattern of interconnection of the $D_3$ digit lines shown in FIG. 3C is not entirely the same as any of those shown in FIGS. 3A, 3B and 3D. Also, the pattern of interconnections for the $D_4$ digit lines shown 3D is dissimilar in some respects from each of the patterns shown in FIGS. 3A, 3B and 3C. In other words, each of FIGS. 3A through 3D represents a different basic interconnection pattern.

Where more than four digit lines are used, as in the present embodiment, then the interconnection patterns of FIGS. 3A–3D are repeated for each successive set of four digit lines. Thus, the pattern of FIG. 3A is also used for the $D_5$ digit lines, the FIG. 3B pattern is used for the $D_6$ digit lines, the FIG. 3C pattern is used for the $D_7$ digit lines and the FIG. 3D pattern is used for the $D_8$ digit lines.

It can be shown for any two of the digit line patterns of FIGS. 3A–3D, that a change in current flow in one set of digit lines will induce no net voltage in the other set of digit lines. This assumes that the back terminals (e.g., terminal 38 of FIG. 3A) are disconnected and that the current source is connected between the two input terminals (e.g., terminals 43 and 44 of FIG. 3B) of the appropriate digit line. For the patterns of FIG. 3A and 3B, this can be seen by assuming that a change in current flow toward the right on the $D_2$ digit line portion on frame $F_1$ tends to induce a current flow toward the left on the $D_1$ digit line portion on frame $F_1$, a change in current flow toward the left on the $D_2$ digit line portion on frame $F_2$ tends to induce a current flow toward the right on the $D_1$ digit line portion on frame $F_2$, and so on, for the different $D_1$–$D_2$ pairs on the different frame structures. The induced current is, in each case, assumed to tend to flow in the opposite direction from the current which induced it. If this analysis is followed through step by step and the various induced currents added up, it is seen that the net current flow in the complete $D_1$ digit line is zero.

Unfortunately, there is a second order effect which also tends to occur, at least theoretically. In particular, a change in current flow in the $D_2$ digit line portion on frame $F_1$ is not entirely limited to inducing a voltage or current in the portion of the $D_1$ line on only frame $F_1$. Thus, for example, a change in current flow in the $D_2$ portion on frame $F_1$ also tends to induce some voltage in the portion of the $D_1$ line on frame $F_2$. In the embodiment of FIG. 2, however, where the spacing between the different frame structures $F_1$, $F_2$, etc., is greater than the spacing between neighboring digit lines $D_1$, $D_2$, etc., this effect is not as serious as the primary cause of cross-coupling considered above. Also, and more importantly, it has been found that with the present interconnection patterns these secondary components also tend to largely cancel one another.

Measurements on a magnetic core memory system using the teachings of this invention have also revealed a further advantage for the interconnection patterns indicated in FIGS. 3A–3D. This advantage is that current flowing in one of the $Y_1$, $Y_2$, etc., bus bars running along the lower border of the frame structures $F_1$, $F_2$, etc., will induce very little undesired voltage in any of the various digit lines. This would also apply to any other external conductor running parallel to the digit lines.

It may be helpful to note that each of the interconnection patterns of FIGS. 3A–3D can be broken down into sub-groups, with each sub-group corresponding to one or the other of two different basic sub-group patterns. One type of sub-group pattern (type I) is represented by the $D_1$ digit line portions on frames $F_1$–$F_4$. In this type I sub-group pattern, the $F_1$ current flows toward the right, the $F_2$ and $F_3$ currents flow toward the left and the $F_4$ current flows toward the right. The other basic sub-group pattern (type II) is represented by the $D_3$ digit line portions on frames $F_1$–$F_4$. In this case, the $F_1$ current flows toward the left, and $F_2$ and $F_3$ currents flow toward the right and the $F_4$ current flows toward the left. This is the opposite of the case for the type I sub-group pattern. Using this sub-group analysis, the pattern of FIG. 3A can be broken down into four successive type I sub-groups. The pattern of FIG. 3B, on the other hand, is seen to comprise a type I sub-group followed by a type II sub-group followed by a type I sub-group followed by a type II sub-group.

Figure 4:
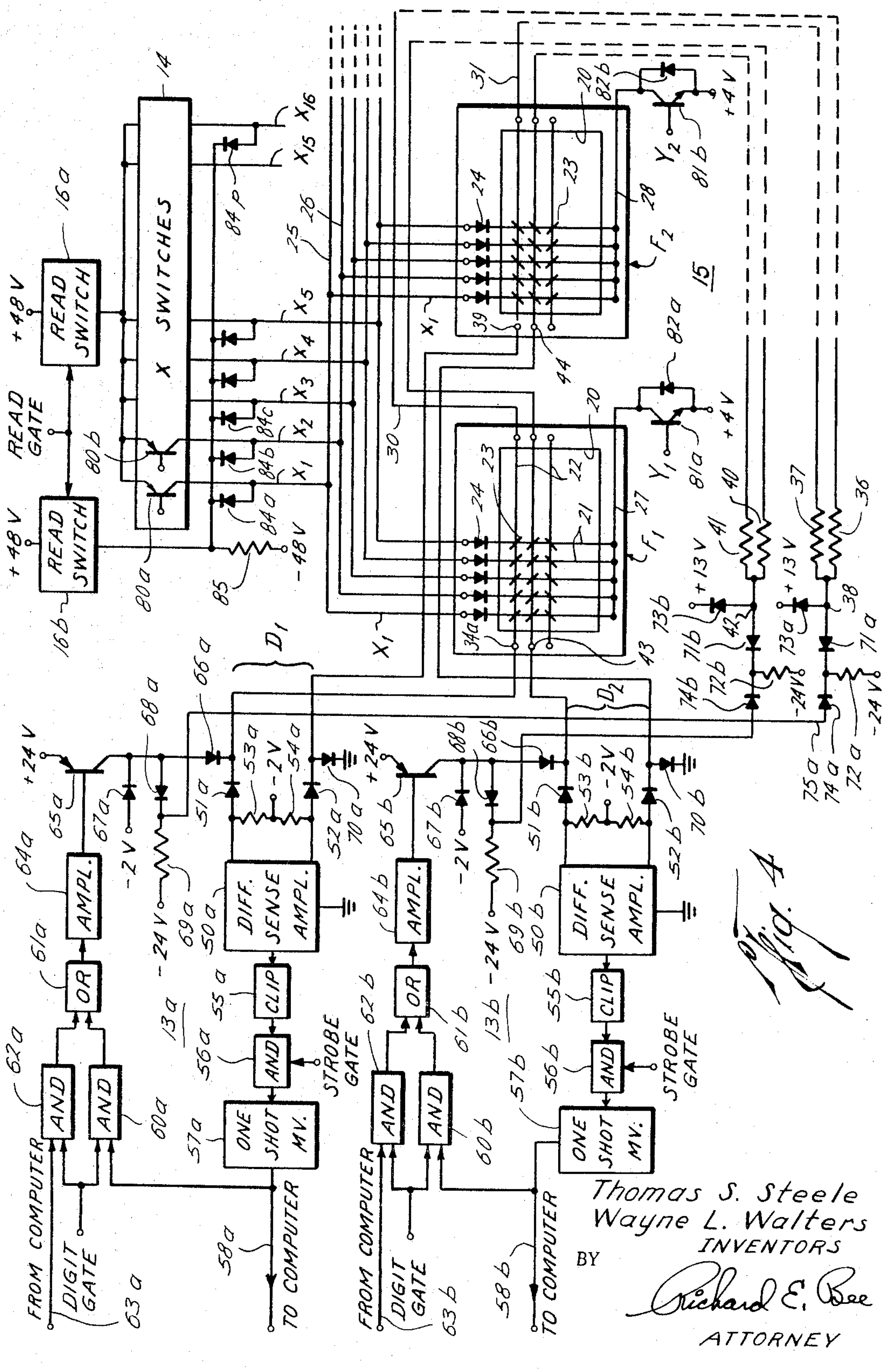
FIG. 4 is a circuit diagram showing in greater detail various circuits used with the core memory unit of FIG. 2.

Referring now to FIG. 4 of the drawings, there is shown a circuit diagram of a representative embodiment of circuits for operating the core memory unit 12 just considered. FIG. 4 is a partial circuit diagram in the sense that where a large number of devices or circuits are used in a similar manner in the actual apparatus, only enough of these devices or circuits are shown in FIG. 4 as are necessary to comprehend the operation of the apparatus. Thus, only two of the frame structures, namely, $F_1$ and $F_2$, are shown in FIG. 4. The other fourteen frame structures are omitted for sake of simplicity. Also, while the apparatus of the present embodiment uses eight sets of sense-digit-circuits, only a pair of these circuits, namely circuits 13a and 13b are shown in FIG. 4.

Considering the sense-digit circuits 13a for the $D_1$ digit line, the two front end terminals 34a and 39 for this digit line are connected to the input of a differential sense amplifier 50a. This connection is made by way of a pair of semiconductor diodes 51a and 52a. A pair of resistors 53a and 54a are connected in series across the input of the sense amplifier 50a. The center tap between these resistors is connected to a supply terminal for a −2 volt D.C. source. Each of the resistors 53a and 54a has a resistance value equal to the characteristic impedance of the portion of the $D_1$ digit line associated therewith. In this regard, the digit line portions on the odd numbered frames $F_1$, $F_3$, etc. are associated with the resistor 53a, while the digit line portions on the even numbered frames $F_2$, $F_4$, etc. are associated with the resistor 54a. The output of the sense amplifier 50a is coupled by way of an amplitude-discriminating clipper circuit 55a and a two-input AND circuit 56a to a one-shot multivibrator 57a The second input of AND circuit 56a is connected to a source of strobe gate signals located in the read-write timing unit 17 of FIG. 1. The output of the one-shot multivibrator 57a is coupled by way of an output line 58a to the digital computer 10 of FIG. 1 for supplying data signals thereto.

The output of the one-shot multivibrator 57a is also coupled to a first input of a two-input AND circuit 60a. AND circuit 60a is coupled to an OR circuit 61a. A second AND circuit 62a is also coupled to the OR circuit 61a. A first input of the AND circuit 62a is coupled to an input line 63a coming from the digital computer 10 of FIG. 1. The second inputs of the AND circuits 60a and 62a are connected to a source of digit gate signals located in the read-write timing unit 17 of FIG. 1. The output of the OR circuit 61a is coupled by way of an amplifier 64a to a digit driver or output stage which includes a transistor 65a. The collector electrode of transistor 65a is coupled by way of a semiconductor diode 66a to the end terminal 34a of the $D_1$ digit line. The collector of transistor 65a is also coupled by way of a semiconductor diode 67a to a −2 volt D.C. supply terminal and by way of a semiconductor diode 68a and a resistor 69a to a −24 volt D.C. supply terminal. The emitter of transistor 65a is connected to a +24 volt supply terminal. A semiconductor diode 70a is connected between the end terminal 39 of the $D_1$ digit line and ground.

The two rear end resistors 36 and 37 associated with the $D_1$ digit line and discussed in connection with FIG. 3A are also shown in FIG. 4. The common terminal 38 associated with these resistors 36 and 37 is coupled by way of a semiconductor diode 71a and a resistor 72a to a −24 volt D.C. supply terminal. The common terminal 38 is also coupled by way of a semiconductor diode 73a to a +13 volt D.C. supply terminal. The junction between the diode 71a and the resistor 72a is coupled by way of a semiconductor diode 74a and a connecting line 75a to a junction point between the diode 68a and the resistor 69a associated with the digit driver transistor 65a. The rear end resistors 36 and 37 associated with the $D_1$ digit line are proportioned to have a resistance value equal to one-half the characteristic impedance of the digit line portion associated therewith. The resistor 72a, on the other hand is proportioned to have a resistance value which is ten or more times greater than the resistance of either resistor 36 or resistor 37.

The sense-digit circuits 13b for the $D_2$ digit line are constructed in the same manner as just considered for the $D_1$ digit line circuits. A corresponding set of sense-digit circuits is also provided for each of the other digit lines of the core memory unit 12, though these have been omitted from FIG. 4 for sake of simplicity.

Additional details of portions of the X and Y switches and circuits associated therewith are also given in FIG. 4. Also, as indicated, read switches 16 of FIG. 1 include a pair of individual read switch circuits 16a and 16b, each of which is controlled by a read gate signal obtained from the read-write timing unit 17 of FIG. 1.

As seen in FIG. 4, the X switches 14 comprise a number of transistors 80a, 80b, etc. having their emitters connected to the read switch 16a and having their collectors individually connected to different ones of the word line bus bars $X_1$, $X_2$, etc. The base electrodes of the switch transistors 80a, 80b, etc. are connected to the X address lines coming from the digital computer 10.

As indicated in FIG. 4, the Y switches include a number of transistors 81a, 81b, etc having their emitters connected to a +4 volt D.C. supply terminal and having their collectors individually coupled to different ones of the bus lines 27, 28, etc. running along the bottom borders of the different frame structures $F_1$, $F_2$, etc. The base electrodes of transistors 81a, 81b etc. are connected to the Y address lines coming from the digital computer 10. Each of the Y switch transistors 81a, 81b etc. has a corresponding one of diodes 82a, 82b, etc. connected in shunt between the emitter and collector thereof.

Each of the $X_1$, $X_2$, etc. word line bus bars running to the X switches 80a, 80b, etc. is coupled by way of an individual one of semiconductor diodes 84a, 84b, etc. to a common resistor 85. The other side of resistor 85 is connected to a −48 volt D.C. supply terminal. The upper side of resistor 85 is connected to the second read switch 16b.

Figure 5:
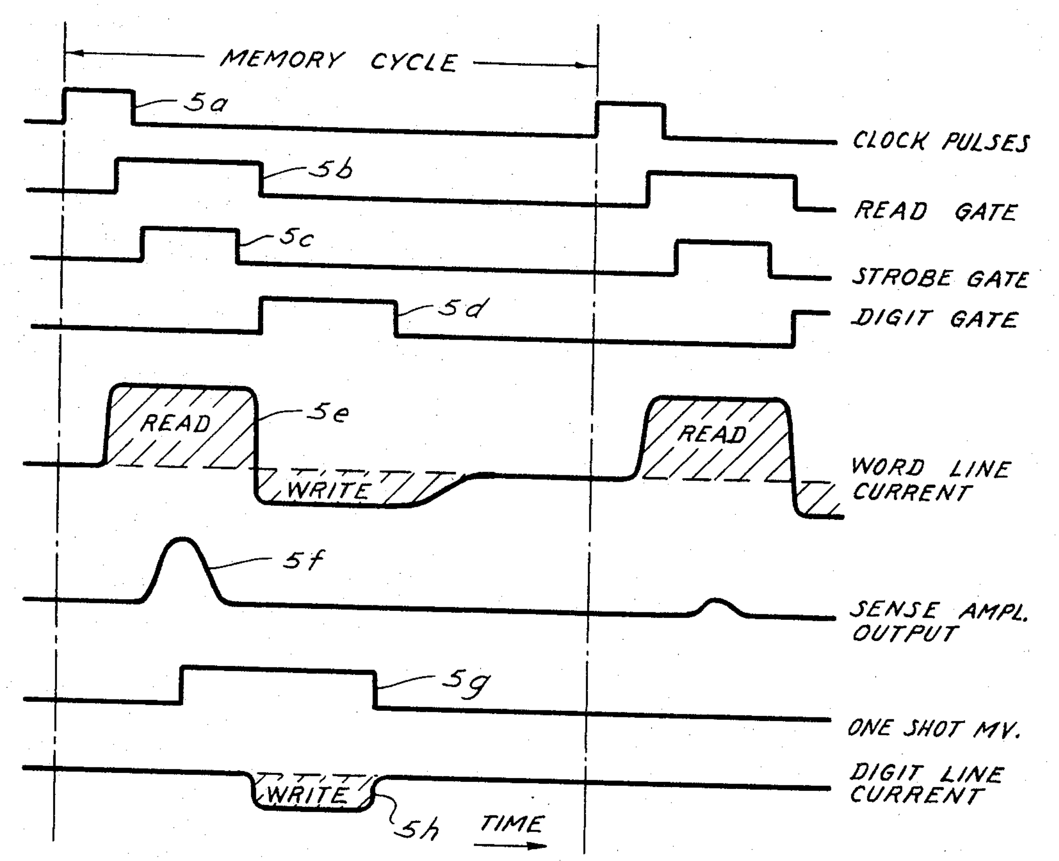
FIG. 5 is a signal timing diagram used in explaining the operation of the FIG. 4 circuits.

Considering now the operation of the memory system embodiment of FIGS. 1–4, this operation will be explained with the aid of the signal timing diagram of FIG. 5. Clock pulses, as indicated by waveform 5a of FIG. 5, are generated by the computer timing unit 11 of FIG. 1. These clock pulses are supplied to the read-write timing unit 17 of FIG. 1. In response thereto, the read-write timing unit 17 acts to produce periodic read gate pulses indicated by waveform 5b, periodic strobe gate pulses indicated by waveform 5c and periodic digit gate pulses as indicated by waveform 5d, all of FIG. 5. To this end, the read-write timing unit 17 may include appropriate delay circuits and triggered pulse generating circuits. The read gate, strobe gate and digit gate pulses are used to control the operation of the remainder of the memory system.

It will first be assumed that the pertinent bits of data have been previously stored in the core memory unit 12 and that the purpose is to interrogate the core memory unit and supply the desired stored data to the digital computer 10. Immediately before the beginning of any particular memory cycle during which it is desired to extract a particular data word from the core memory unit 12, the appropriate X and Y address signals for this particular word are supplied from the digital computer 10 to the X and Y switches 14 and 15. Assuming that it is desired to select the data word having an address of $X_1$ and $Y_1$ and referring to FIG. 4 of the drawings, then the X address signal turns on the transistor switch 80a and the Y address signal turns on the transistor switch 81a. During the occurrence of the ensuing read gate pulse (waveform 5b), read switches 16a and 16b are rendered conductive. As a consequence, current flows from the +48 volt supply terminal through read switch 16a, transistor 80a, the $X_1$ word line 21 of frame $F_1$ and the diode 24 associated therewith, the common $F_1$ output line 27, and the $Y_1$ transistor 81a to the +4 volt supply terminal. This word line "read" current is indicated by wave form 5e of FIG. 5. It is a "full read" current and is of sufficient magnitude to drive any of the magnetic cores 23 on the $X_1$ word line of frame $F_1$ from their binary "one" state to their binary "zero" state.

A "one" to "zero" transition in any of the cores 23 will generate a voltage pulse on the digit line 22 which also passes through that core. Assuming that the magnetic core 23 located at the intersection of the $X_1$ word line and the $D_1$ digit line on frame $F_1$ undergoes such a "one" to "zero" transition, then a voltage pulse appears at the end terminal 34a of the $D_1$ digit line and is supplied by way of diode 51a to the sense amplifier 50a.

During this "read" portion of the memory cycle, both of diodes 51a and 52a are in a conductive condition because of the condition of diode 71a at the rear end of the $D_1$ digit line. Diode 71a is conductive and thus serves to connect the rear end terminal 38 of the $D_1$ digit line to the −24 volt supply terminal located at the lower end of resistor 72a. Thus, during the "read" portion of each memory cycle, current flows from the −2 volt supply terminal through each of resistors 53a and 54a, each of diodes 51a and 52a, down through the two halves of the $D_1$ digit line, out through the rear end resistors 36 and 37 and through the diode 71a and the resistor 72a to the −24 volt supply terminal. Because of the relatively large size of resistor 72a, this current is relatively small and is only large enough to keep the diodes 51a and 52a conductive. It is not large enough to cause any of the magnetic cores 23 to change their states.

The remainder of the sense-digit circuits, 13b, etc., are in a like condition during the "read" portion of the memory cycle. Thus, diodes 51b and 52b are also conductive at this time.

The voltage pulse supplied to the sense amplifier 50a is amplified thereby and reproduced at the output thereof. This pulse, as it appears at the output of the sense amplifier 50a, is represented by the first pulse of waveform 5f. The second and much smaller pulse of waveform 5f represents the case where the particular magnetic core being considered is in its "zero" state at the time read current is passed down the word line. Thus, some voltage may be generated even though the core is in its "zero" state, but this voltage is of much smaller amplitude than the desired "one" indication. In any event, the clipper circuit 55a provides an amplitude discriminating action whereby only voltage pulses exceeding a predetermined level are allowed to pass therethrough. In this manner, only the upper portions of the desired "one" pulses appear at the output of clipper circuit 55a. These "one" pulse are then passed by AND circuit 56a since a strobe gate signal (waveform 5c) is being supplied to the second input of such AND circuit at this time. After passage through the AND circuit 56a, the "one" pulse operates to trigger the one-shot multivibrator 57a. The resulting waveform at the output of one-shot multivibrator 57a is represented by waveform 5g of FIG. 5. This waveform or pulse is supplied to the digital computer 10 to tell the computer that a "one" value was stored in the first bit or digit of the selected word.

At the same time, appropriate "one" or "zero" signal indications are being supplied to the computer 10 by the remainder of the sense-digit circuits for the remainder of the digit positions of the selected word. In this particular embodiment, a 'one" is represented by the presence of a pulse, while a "zero" is represented by the absence of a pulse.

Since the interrogation of the selected word line has placed each of the magnetic cores 23 thereof in a "zero" condition, the information or data stored on that line has, in effect, been destroyed. Consequently, it is necessary to restore or rewrite this date if it is to be available for future use. This rewriting is accomplished automatically with the present apparatus. To this end, the "one" signal appearing at the output of one-shot multivibrator 57a is supplied by way of AND circuit 60a, through OR circuit 61a and the amplifier 64a to the digit driver transistor 65a. Passage of the "one" signal through the AND circuit 60a is controlled by the digit gate signal supplied to the second input thereof. As indicated by waveform 5d, this digit gate signal commences at about the time the "read" portion of the memory cycle terminates and is thus effective to allow passage of a substantial part of the output from one-shot multivibrator 57a to the digit driver transistor 65a.

The digit driver transistor 65a is normally non-conductive and remains in such non-conductive condition during the "read" portion of the memory cycle. Upon the occurrence of a "'one" indication at the output of OR circuit 61a, the base electrode of transistor 65a is driven negative so as to render this transistor conductive. (The necessary polarity reversal may be provided in the amplifier 64a.) Conduction in the transistor 65a places the collector electrode thereof at a potential level of roughly +24 volts. This renders diode 67a non-conductive. It also places the junction between diode 68a and resistor 69a at a potential of approximately +24 volts. This, in turn, places the junction between diode 74a and the resistor 72a associated with the rear end of the $D_1$ digit line at a potential of approximately +24 volts. This renders the diode 71a non-conductive. This, in effect, disconncets the rear end terminal 38 of the $D_1$ digit line from the remainder of the circuit and, in particular, from the −24 volt supply terminal at the lower end of resistor 72a.

At the same time, current flowing through the digit driver transistor 65a also passes through diode 66a, into the terminal 34a of the $D_1$ digit line, down the first half of the $D_1$ digit line, through rear end resistors 36 and 37, back up through the other half of the $D_1$ digit line, out through terminal 39 (frame $F_2$) and through the diode 70a to ground. This digit line current is represented by waveform 5h of FIG. 5. While this digit line current is flowing during the "write" (or "rewrite") portion of the memory cycle, the input diodes 51a and 52a of the sense amplifier 50a are reversed biased to a non-conductive condition so that no signals may reach the sense amplifier 50a at this time. At the same time, the diode 73a coupled between the rear end terminal 38 and the +13 volt supply terminal operates as a voltage limiter to prevent the voltage on the $D_1$ digit line from exceeding +13 volts.

As is intended to be represented by the amplitude of the "write" current pulse of waveform 5h, the "write" current flowing on the $D_1$ digit line is a half- amplitude "write" current. The magnitude of this digit line "write" current is, by itself, insufficient to cause any of the magnetic cores 23 to change their state. The manner in which the remainder of the "write" current is supplied to the magnetic cores 23 is rather unique. In particular, the other half of the "write" current is obtained by means of a reverse current flow on the word line 21 which was previously energized during the "read" portion of the memory cycle. In obtaining this reverse current flow, use is made of the charge storage effect in the semiconductor diode 24 which was conductive during the "read" portion of the cycle.

During the read portion of the cycle, the read switch 16b is conductive so that the upper end of resistor 85 is at a relatively high positive potential. This keeps diodes 84a, 84b, etc. non-conductive. During the "write" portion of the memory cycle, however, the read gate signal is no longer present and, hence, read switch 16b is non-conductive. Read switch 16a is also non-conductive at this time. As a result, one of diodes 84a, 84b, etc. is now forward biased rendered conductive by the −48 volt supply terminal at the lower end of resistor 85. Because of the charge storage effect, that is, the storage of minority carriers during forward conduction, the diode 24 which was previously conductive is able to sustain a relatively high reverse current flow for a short period of time following the termination of forward conduction. In the present example, this is the diode 24 connected to the $X_1$ word line of frame $F_1$. Consequently, during the "write" portion of the memory cycle, current flows from the +4 volt supply terminal of the $Y_1$ transistor 81a, through diode 82a, up through the $X_1$ word line of frame $F_1$, through the associated diode 24, through the diode 84a and through the resistor 85 to the −48 volt supply terminal.

This reverse word line current or "write" current is represented on waveform 5e by the negative-going portion thereof. This is a half-amplitude "write" current and, by itself, will not cause any of the magnetic cores 23 to change their states. If, however, both the word line and the digit line passing through any given magnetic core 23 are each carrying a half-amplitude "write" current, then these two half-amplitude write currents together are sufficient to cause the magnetic core 23 to change its state. For the present example, since the $D_1$ digit line is carrying a half-amplitude "write" current and since the $X_1$ word line of frame $F_1$ is also carrying a half-amplitude "write" current, the magnetic core 23 located at the intersection of these two lines is switched back to its "one" state.

In a similar manner, any of the other of the magnetic cores 23 on the $X_1$ word line of frame $F_1$ will be switched back to a "one" state if, and only if, their digit lines are also carrying a half-amplitude "write" curent. In this manner, the eight bits of data previously stored in the eight magnetic cores 23 of the $X_1$, $F_1$ word line are restored in these cores.

Note that the word line which is energized with reverse current during the "write" portion of the memory cycle is determined by the particular one of diodes 24 which was previously undergoing forward conduction. In this sense, the diodes 24 behave like memory devices and could very well be called "memory" diodes.

After the termination of the "write" portion of the memory cycle, the core memory unit 12 is allowed to remain quiet for a short period of time. After this, the core memory unit 12 is ready to undergo its next cycle of operation wherein another data word is selected and supplied to the digital computer 10.

In addition to supplying previously stored data to the digital computer 10, the mode of operation of the system can be changed so as to take new data from the computer 10 and store it in the core memory unit 12. Considering now the storage of this new data, the core memory unit 12 is operated in a manner similar to that previously considered except that in this case no strobe gate signals are supplied to the AND circuits 56a, 56b, etc. of the sense-digit circuits (FIG. 4). This elimination of the strobe gate signal is obtained by an appropriate instruction signal from the digital computer 10 which is supplied to the read-write timing unit 17 over an inhibit line.

As before, the X and Y address signals are supplied to the X and Y switches 14 and 15 just prior to the beginning of the memory cycle so as to select a particular one of the word lines. In this case, the selected word line is the word line on which the new data is to be stored. The read switches 16a and 16b are then rendered conductive by the read gate signal so as to cause forward current flow through the selected word line. This sets all of the magnetic cores 23 on the selected word line to a "zero" state thus, in effect, erasing any previous data that is contained in these cores. No signals are supplied to the digital computer 10 by the sense-digit circuits 13a, 13b, etc. because, in the absense of strobe gate signals, no signals can get through the AND circuits 56a, 56b, etc.

The signals for driving the digit driver transistors 65a, 65b, etc. are obtained from the digital computer 10 by way of input lines 63a, 63b, etc. Depending upon whether these signals are "ones" or "zeros," the occurrence of the digit gate signal during the "write" portion of the memory cycle causes the appropriate ones of the digit driver transistors 65a, 65b, etc. to be rendered conductive. This causes a half-amplitude "write" current to flow on the appropriate ones of the digit lines $D_1$, $D_2$, etc. As before, reverse current flow on the previously energized word line supplies the other half of the "write" current. As a consequence, the appropriate magnetic cores 23 on the selected word line are set to the "one" state.

Regardless of whether new data is being received from the computer 10 or old data is being supplied to the computer 10, there are certain troublesome problems which tend to occur and which have been overcome by the present invention. A primary cause of these problems is the fact that, when the "write" current on the digit lines is turned on or turned off, relatively large electrical transients tend to be produced on the digit lines. Since the digit lines are relatively close to one another, the transients produced on one digit line would, in the absence of the present invention, induce rather large transients on the neighboring digit lines. This can cause the magnetic core 23 of the neighboring digit line to store the wrong binary value. Thus, if a "zero" value was intended to be stored on the core of the neighboring line, then the undesired induced current could become large enough to cause that core to be set to a "one" or partial "one" state. In other cases, the neighboring digit line could be attempting to store a "one" value and the induced current from the first digit line could oppose this action and cause the neighboring line to fail to store a good full "one" value.

Another problem is that, since each of the digit lines is a form of transmission line the electrical transients occurring on such digit line can be partially reflected back at the ends of the line and, hence, make several trips back and forth on the line before decreasing to an insignificant value. This problem is aggravated if cross coupling between neighboring digit lines is permitted, since the magnitude of the undesired transients or undesired noise on the neighboring line is larger and, hence, takes longer to decreaes to an insignificant level.

In accordance with the present invention, these problems are effectively overcome because, among other things, the unique interconnection of the various digit line portions of each digit line reduces such cross-coupling to a rather small and readily tolerable level. As a consequence, the danger of storing erroneous data values is eliminated. Also, the reduction of noise on the digit lines considerably shortens the time required before the digit lines are quiet enough to enable the next memory cycle to commence. Consequently, the memory cycles are much shorter in length which, in turn, provides a much faster operation of the core memory unit.

In the representative embodiment discussed above, the core memory unit 12 is indicated as having a word capacity of 16×16 words, giving a total of 256 eight-digit words. These particular dimensions are intended as being only representative. If desired, more word lines per frame or a greater number of frames or both can be used. Also, the number of digit lines can be increased so that each word will be composed of more than eight digits.

While there has been described what is at present considered to be a preferred embodiment of this invention, it will be obvious to those skilled in the art that various changes and modifications may be made therein without departing from the invention and it is, therefore, intended to cover all such changes and modifications as fall within the true spirit and scope of the invention.

What is claimed is:

1. A magnetic core memory system comprising:
a system of elongated word lines;
first and second spaced apart sets of elongated digit lines which cross the word lines at recurring junction points;
a plurality of magnetic core elements individually located at different ones of the junction points;
first conductor means connecting the individual digit lines of the first set in series with one another;
and second conductor means connecting the individual digit lines of the second set in series with one another in sequences and with polarities such that half of the digit lines of the second set will carry current in a direction opposite to the direction in which half of the digit lines in the first set will carry current, while the remainder of the digit lines of the second set will carry current in the same direction as the direction in which the remainder of the digit lines in the first set will carry current, thus minimizing the net inductive coupling between the two sets of digit lines.

2. A magnetic core memory system comprising:
a system of elongated word lines;
first and second spaced apart sets of elongated digit lines which cross the word lines at recurring junction points;
a plurality of magnetic core elements individually located at different ones of the junction points;
first conductor means connecting the individual digit lines of the first set in series with one another;
and second conductor means connecting the individual digit lines of the second set in series with one another in sequences and with polarities such that any change in current flow in the second set of digit lines will induce series-opposing voltages in different ones of the individual digit lines contained in the series circuit of the first set, with an approximately equal number of series-opposing voltages of each polarity, so that no appreciable current flow will be induced in the first set of digit lines.

3. A magnetic core memory system comprising:
a plurality of frame structures individually supporting crossed sets of word lines and digit lines and having magnetic core elements individually located at different junction points between the word and digit lines;
a plurality of sets of conductor means individually interconnecting corresponding digit lines on different frame structures;
and a plurality of sense-digit circuit means individually coupled to different ones of the sets of inter-connected digit lines and individually including output circuit means for sensing any signals appearing on the digit lines, energizing circuit means for supplying a writing current to the digit lines, circuit means for placing half of the digit lines in parallel with the other half and connecting both halves to the output circuit means, and selectively operable circuit means for placing both halves of the digit lines in series with one another and in series with the energizing circuit means.

4. A magnetic core memory system comprising:

a plurality of frame structures individually supporting crossed sets of word lines and digit lines and having magnetic core elements individually located at different junction points between the word and digit lines;

a plurality of first address conductor means indiivdually interconnecting one end of one of the word lines in each of the different frame structures, the different first address conductor means being connected to different word lines in any given frame structure;

a plurality of second address conductor means individually interconnecting the other ends of all of the word lines in different ones of the frame structures;

and a plurality of digit line conductor means individually interconnecting different ones of the digit lines in the different frame structures in series with one another to form a plurality of sets of digit lines, the individual digit lines of any two neighboring sets being connected in sequences and with polarities such that half of the digit lines of one set will carry current in a direction opposite to the direction in which half of the digit lines in the other set will carry current while the remainder of the digit lines of the one set will carry current in the same direction as the direction in which the remainder of the digit lines in the other set will carry current, thus minimizing the net inductive coupling between such digit line sets.

5. A magnetic core memory system comprising:

a plurality of frame structures individually supporting crossed sets of word lines and digit lines and having magnetic core elements individually located at different junction points between the word and digit lines;

a plurality of first address conductor means individually interconnecting one end of one of the word lines in each of the different frame structures, the different first address conductor means being connected to different word lines in any given frame structure;

a plurality of second address conductor means individually interconnecting the other ends of all the word lines in different ones of the frame structures;

a plurality of digit line conductor means individually interconnecting different ones of the digit lines in the different frame structures in series with one another to form a plurality of sets of digit lines, the individual digit lines of any two neighboring sets being connected in sequences and with polarities such that half of the digit lines of one set will carry current in a direction opposite to the direction in which half of the digit lines in the other set will carry current, while the remainder of the digit lines of the one set will carry current in the same direction as the direction in which the remainder of the digit lines in the other set will carry current, thus minimizing the net inductive coupling between such digit line sets.

circuit means coupled to the first address conductor means for selectively enabling one of the first address conductor means;

circuit means coupled to the second address conductor means for selectively enabling one of the second address conductor means;

and circuit means coupled to the digit line conductor means for sensing signals induced on the digit lines by changes in magnetic states of the core elements.

References Cited

UNITED STATES PATENTS

| | | | |
|---|---|---|---|
| 2,897,482 | 7/1959 | Rosenberg | 340—174 |
| 2,975,406 | 3/1961 | Stallard | 340—174 |
| 2,995,303 | 8/1961 | Collins | 340—174 |
| 3,134,163 | 5/1964 | Luhn | 340—174 |
| 3,155,942 | 11/1964 | Hoover | 340—174 |
| 3,155,946 | 11/1964 | Stern | 340—174 |
| 3,075,184 | 1/1963 | Warman | 340—174 |
| 3,154,763 | 10/1964 | Bornhauser | 340—174 |
| 3,172,087 | 3/1965 | Durgin | 340—174 |

TERREL W. FEARS, *Primary Examiner.*

JAMES W. MOFFITT, *Examiner.*

M. S. GITTES, *Assistant Examiner.*